Jan. 15, 1924.
H. C. BOWLUS
1,481,180
STOP AND DRAIN VALVE FOR HOSE LINES OR THE LIKE
Filed June 7, 1921
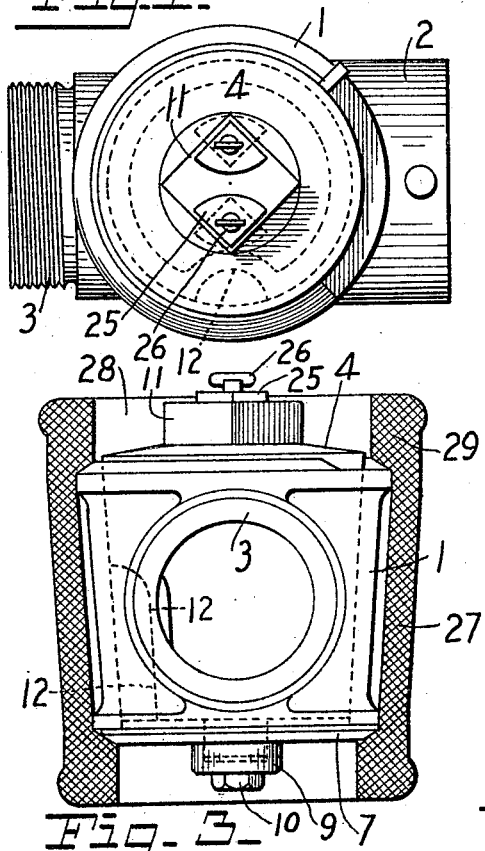
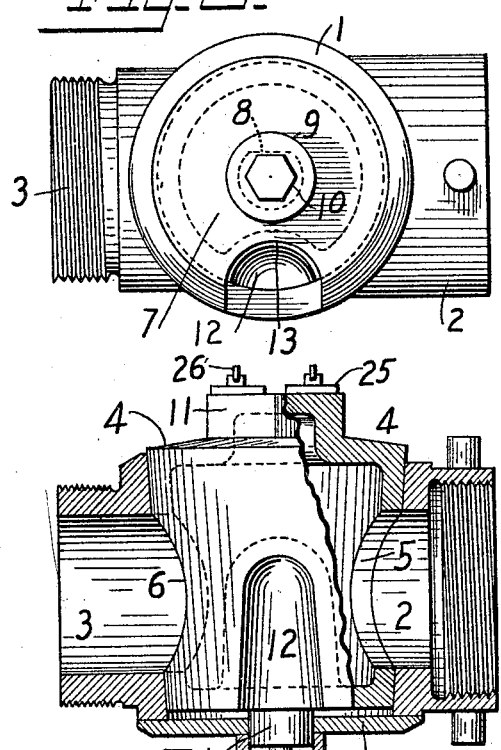
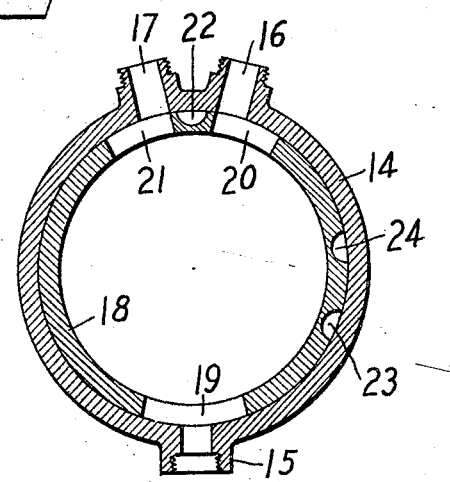
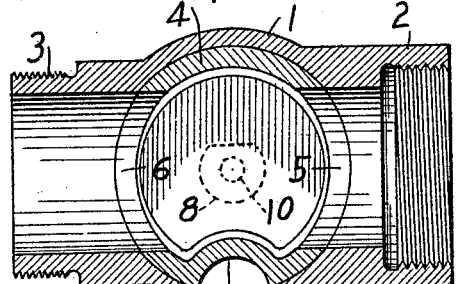
Inventor
HENRY C. BOWLUS.
By
Attorney Patented Jan. 15, 1924.

1,481,180

UNITED STATES PATENT OFFICE.

HENRY C. BOWLUS, OF SPRINGFIELD, OHIO.

STOP AND DRAIN VALVE FOR HOSE LINES OR THE LIKE.

Application filed June 7, 1921. Serial No. 475,828.

*To all whom it may concern:*

Be it known that I, HENRY C. BOWLUS, a citizen of the United States, residing at Springfield, in the county of Clark and State of Ohio, have invented certain new and useful Improvements in Stop and Drain Valves for Hose Lines or the like, of which the following is a specification, reference being had therein to the accompanying drawing.

This invention relates to a stop and drain valve for a hose line or the like.

The invention is designed primarily for use in fire hose lines. It is customary to lead two or more lines of hose from the single hydrant, or a single source of water supply, and in order to cut off the pressure in one of the lines pressure must be cut off in all the lines at that source of supply. Consequently, if it is necessary to replace a section of hose or to add additional sections to the hose line it is not infrequently necessary to put out of use temporarily several lines of hose. Further, in carrying a hose line up a ladder it is necessary either to carry the weight of the water which is in the hose or to cut off one or more lines of hose other than that which is being moved.

The object of the present invention is to provide a stop and drain which can be interposed in a hose line, or the like, at any point between the source of supply and the discharge end thereof to enable the pressure in the outer end of the line to be cut off and the water to be drained therefrom; and to provide such a device which will be simple in its construction, of a strong, durable character and easily operated.

A further object of the invention is to provide such a stop and drain having two or more outlets either or all of which may be cut off and drained at will.

Other objects of the invention will appear as the device is described in detail.

In the accompanying drawings Fig. 1 is a top plan view of a device embodying my invention; Fig. 2 is a bottom plan view of the same; Fig. 3 is an end elevation thereof; Fig. 4 is a longitudinal sectional view taken centrally through such a device with the key partly in elevation; Fig. 5 is a horizontal sectional view of such a device; and Fig. 6 is a horizontal sectional view of a modified form of device having two outlets.

In these drawings I have illustrated one embodiment of my invention and have shown the same as comprising a casing 1 constituting a valve chamber and having an inlet opening 2 and an outlet opening 3, and provided with means for connecting the respective openings with the adjacent ends of two sections of hose, or the like. Movably mounted in the valve casing is a valve member, or key, having a passageway movable into and out of a position to connect the inlet and outlet openings one with the other. In the present construction this key is in the form of a turn plug 4 which is preferably hollow and is provided in its opposite sides with ports 5 and 6 adapted to be moved into and out of registration respectively with the openings 2 and 3 to thereby establish communication between these openings through the hollow body of the plug. The key, or plug, may be retained in position in the casing in any suitable manner but, as here shown, it is slightly tapered toward its lower end and is held to its seat by a plate 7 which bears on the lower edge of the valve chamber and is mounted upon a stud 8 projecting from the bottom of the key. A cup shaped washer 9 fits over the end of the stud 8, bears against the plate 7 and is held in position by a screw 10 extending through the washer and into the stud. At its opposite end the key is provided with a squared head 11 to which a wrench or other suitable implement may be applied for turning the key.

Formed in the outer surface of the key is a groove, or channel, 12 which is so arranged that when the key has been turned to interrupt the communication between the inlet and the outlet of the valve casing the channel will be in open communication with the outlet. This channel communicates at its lower end with an opening in the casing, the opening being formed, in the present instance, in the plate 7, as shown at 13, and, consequently, the water in the outer portion of the line will drain back through the outlet 3, channel 12 and opening 13. The arrangement of the drain or channel 11 in the outer surface of the turn plug is important and adds materially to the value of the device because it is so arranged that it can not be readily stopped up and it does not in any way interfere with the normal flow of the water. Further, it simplifies the manufacture of the valve and enables the latter to be produced at a relatively low cost.

If desired, the valve casing may be provided with two or more outlets and the key so constructed and arranged that either or both of these outlets may be cut off and drained at the will of the operator. As shown in Fig. 6 the casing 14 has an inlet 15 and outlets 16 and 17. The key 18 has an elongated port 19 adapted to be moved into and out of registration with the inlet opening 15 and of such length that a partial rotation may be imparted to the key without closing the inlet port. The key is further provided with ports 20 and 21 adapted to register with the outlets 16 and 17 respectively. The port 20 is of such a length that the key may be rotated a short distance to the left without closing the outlet 16 and the port 21 is of such a length and is so arranged relatively to the outlet 17 that the key may be rotated a short distance to the right without closing the outlet 17. Arranged in the outer periphery of the plug, or key, and between the ports 20 and 21, is a channel, or drain, 22 similar to the drain 12, above described. The arrangement of this channel is such that when the key is moved to the left to close the outlet 17 the channel will be moved into line with that outlet, the elongation of the port 20 preventing the outlet 16 from being closed. Likewise, when the key is rotated to the right the outlet 16 will be closed and the channel 22 brought into line with that outlet, the elongation of the port 21 preventing the port 17 from being closed. Thus it will be apparent that either outlet may be closed without interrupting the flow of water through the other. The construction is also such that both ports can be cut off and drained if desired and as here shown the key is provided with other drain channels 23 and 24 so arranged with relation to the ports in the key that the rotation of the key through approximately one-fourth of a revolution will bring these channels into line respectively with the outlets 17 and 16. At the same time the wall of the key will be moved into line with the inlets 15 to close the same.

I have also found it desirable to provide means for temporarily attaching the wrench or other implement to the key to prevent its accidental displacement, and, as here shown, I have provided the squared head 11 of the key, at opposite corners, with plates 25 which are preferably sector shaped and of such size that they will normally lie within the edges of the squared end of the key, but by rotating the same they may be caused to project beyond the edges of the squared end of the key and to overlap the upper edge of a wrench or the like which may have been applied to this end of the key. The plates are secured to the end of the key by thumb screws 26 which may be tightened down to secure the plates firmly in their adjusted positions.

It may also be found desirable to provide some means for protecting the device, which is usually formed of brass, from damage due to rough handling or dragging over paved streets. Under such circumstances a jacket, or hood, 27, of rubber or other suitable material, may be placed about the casing 1, as shown in Fig. 3, the hood having an opening 28 at its upper end to permit the application of the wrench to the squared head 11 of the key and having a flange 29 surrounding the opening and protecting the head of the key. The hood is also provided with an opening in its lower end to permit the escape of water through the opening 13 in the casing. The hood may be applied to the valve casing in any suitable manner. If the hood is made of rubber having sufficient elasticity it may be stretched over the casing, or it may be split vertically along one side thereof and after being placed in position the edges connected by vulcanizing or in any other suitable manner.

While I have shown and described two embodiments of my invention I wish it to be understood that I do not desire to be limited to the details thereof as various modifications may occur to a person skilled in the art. Further, it will be understood that the invention is not limited in its use to hose lines but may be used with fluid conveying pipes, or conduits, of various kinds.

Having now fully described my invention what I claim as new and desire to secure by Letters Patent, is:

1. A device to connect a single hose line with a plurality of branch hose lines and having means to disconnect one or more of said branch lines from said single line and to drain the water from the branch line or lines so disconnected.

2. In a stop and drain valve for a hose line or the like, a casing having an inlet and two outlets, and a key rotatably mounted in said casing and having a plurality of ports arranged to connect either or both of said outlets with said inlet, said key also having a drain channel arranged to move into line with either of said outlets which may be disconnected from said inlet.

3. In a stop and rain valve for a hose line or the like, a casing having an inlet and a plurality of outlets, and a key rotatably mounted in said casing and having a plurality of ports arranged to connect one or a plurality of said outlets with said inlet according to the position of said key, said key also having a plurality of drain channels so arranged that one of said channels may be moved into line with each outlet and which is disconnected from said inlet.

4. In a stop and drain valve for a hose line or the like, a casing having an inlet and two outlets, and a key rotatably mounted in said casing and having a plurality of ports arranged to connect either or both of said outlets with said inlet, said key also having a drain channel arranged to move into line with either of said outlets which may be disconnected from said inlet, and having other drain channels arranged to be moved into line with the respective outlets when both outlets are disconnected from said inlet.

5. In a stop and drain valve for a hose line or the like, a casing having an inlet opening and a plurality of outlet openings, a hollow key rotatably mounted in said casing and having an elongated port arranged to register with said inlet opening and having other ports arranged to register respectively with said outlet openings and a drain channel formed in the outer surface of said key, said ports and said channel being so arranged that either of said outlet openings may be closed and drained without interfering with the flow of fluid through the other outlet.

6. In a stop and drain valve for hose lines and the like, a valve casing having an inlet opening and two outlet openings, a hollow key rotatably mounted in said casing and having an elongated port to register with said inlet opening and having other ports to register with the respective outlet openings, said last mentioned ports being elongated and extending in opposite directions beyond the respective outlet openings, and a longitudinally extending groove formed in the outer surface of said key between the last mentioned ports.

7. In a stop and drain valve for hose lines and the like, a valve casing having an inlet opening and two outlet openings, a hollow key rotatably mounted in said casing and having an elongated port to register with said inlet opening and having other ports to register with the respective outlet openings, said last mentioned ports being elongated and extending in opposite directions beyond the respective outlet openings, and a longitudinally extending groove formed in the outer surface of said key between the last mentioned ports, and other grooves formed in the outer surface of said key and arranged to be moved into line with the respective outlet openings when the first mentioned port has been moved out of line with said inlet opening.

8. In a stop and drain valve for hose lines or the like, a casing having an inlet opening and an outlet opening, a hollow key rotatably mounted in said casing and having ports to register with the respective openings therein and also having a groove in the outer surface thereof arranged to be moved into line with said outlet opening when said ports are moved out of line with the respective openings, said key having an angular head to receive a wrench or the like, and locking devices carried by said head to secure said wrench in position thereon.

9. In a stop and drain valve for hose lines or the like, a casing having an inlet opening and an outlet opening, a hollow key rotatably mounted in said casing and having ports to register with the respective openings therein and also having a groove in the outer surface thereof arranged to be moved into line with said outlet opening when said ports are moved out of line with the respective openings, said key having an angular head to receive a wrench or the like, locking plates mounted on said head, lying normally within the edges thereof and movable beyond said edges, and fastening devices to secure said locking plates in their adjusted positions.

10. In a stop and drain valve for hose lines or the like, a casing having an inlet opening and an outlet opening, a hollow key rotatably mounted in said casing and having ports to register with the respective openings therein and also having a groove in the outer surface thereof arranged to be moved into line with said outlet opening when said ports are moved out of line with the respective openings, said key having an angular head to receive a wrench or the like, and a protecting hood enclosing said casing and having an opening therein to permit access to be had to the head of said key.

11. A stop and drain valve adapted to be interposed between two sections of a hose line or the like and comprising a casing having an inlet opening and an outlet opening, a key rotatably mounted in said casing having a passageway adapted to be moved into and out of a position to connect said inlet opening with said outlet opening and having in its outer surface a channel arranged to be moved into line with said outlet opening when said key has been rotated to move said passage out of line with said inlet opening and said outlet opening, said channel extending through the end of said key, and a plate secured to and rotating with said key and having an opening therethrough arranged in line with the open end of said channel.

In testimony whereof, I affix my signature hereto.

HENRY C. BOWLUS.